United States Patent [19]

Martin

[11] 4,067,135
[45] Jan. 10, 1978

[54] FISHING LURE AND BAIT THEREFOR

[76] Inventor: Raymond W. Martin, 1601 Little Orchard St., San Jose, Calif. 95110

[21] Appl. No.: 713,787

[22] Filed: Aug. 12, 1976

[51] Int. Cl.² .................................................. A01K 83/06
[52] U.S. Cl. .......................................... 43/43.14; 43/44.2; 43/44.6
[58] Field of Search ..................... 43/44.2, 44.6, 43.14

[56] References Cited

U.S. PATENT DOCUMENTS

| 2,207,319 | 7/1940 | Hollopeter | 43/44.6 |
|---|---|---|---|
| 2,518,593 | 8/1950 | Bell | 43/44.2 |
| 2,763,086 | 9/1956 | Johnson et al. | 43/44.2 |
| 2,808,677 | 10/1957 | Dusablon et al. | 43/43.14 X |
| 2,958,153 | 11/1960 | Yerman et al. | 43/43.14 |
| 3,645,031 | 2/1972 | Egles | 43/44.2 |

Primary Examiner—Russell R. Kinsey
Assistant Examiner—Daniel J. Leach
Attorney, Agent, or Firm—Phillips, Moore, Weissenberger, Lempio & Majestic

[57] ABSTRACT

The invention comprises a fishing lure adapted to hold live, dead and artificial bait, and useful for deep fishing, shallow fishing, and trolling, as well as with an artificial bait particularly useful therewith. The lure includes a cup having a generally elliptical open end and a generally linear closed end for holding a first portion of a bait therein. A first plane passing through a first of the two axes of the generally elliptical open end generally includes the linear closed end. A second plane passing through a second of the two axes of the generally elliptical open end is generally perpendicular to the linear closed end. A generally isosceles triangular member extends from the linear closed end of the cup with a base end of the triangle being generally co-extensive with the linear closed end of the cup, with an apex of the triangle being spaced from the first plane so that the triangular member forms an angle with the first plane. A leader engaging eye extends from adjacent generally a portion of the base end of the triangle towards the first plane. Bait holding rods extend from the open end of the cup generally longitudinally away from the linear closed end thereof. The bait holding rods include anchors for anchoring into a second portion of the bait. A fish hook extends from the open end of the cup into the general vicinity of the second portion of the bait. The bait, when it is artificial, comprises a first portion extending into the cup and a second portion extending into the vicinity of the anchoring means, the second portion having holes formed thereinto, for receiving the anchoring means.

12 Claims, 6 Drawing Figures

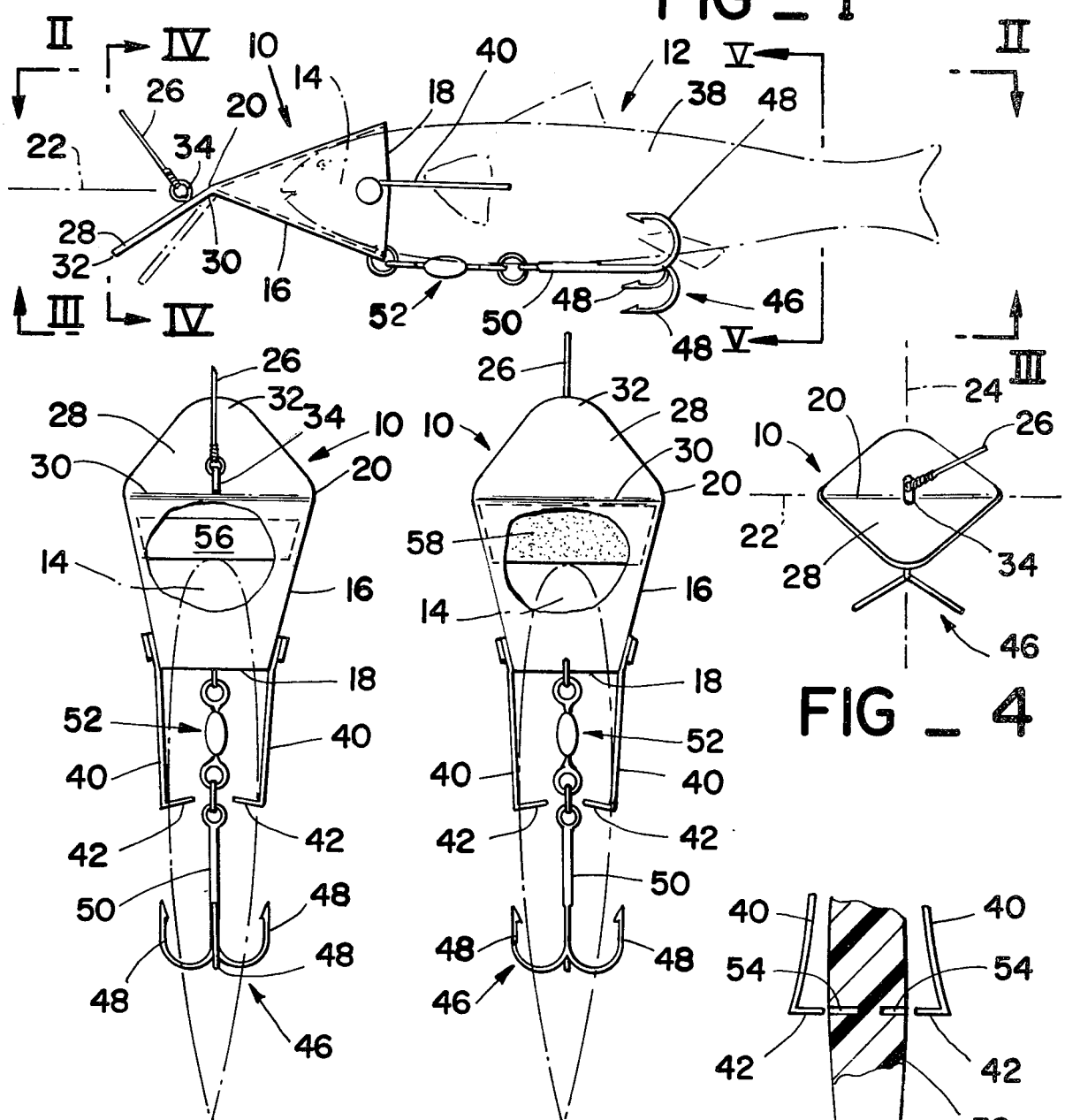

FISHING LURE AND BAIT THEREFOR

BACKGROUND OF THE INVENTION

1. Field of the Invention

The invention is concerned with fishing lures, and more particularly with fishing lures which are useful for deep fishing, shallow fishing, and trolling, and in which live, dead and artificial bait may be used.

2. Prior Art

A great number of fishing lures exist. These take a number of different shapes. Generally, different fishing lures are used for deep fishing than are used for shallow fishing or trolling because of the different properties needed in a lure for each of these types of fishing. Lures which are capable of holding live bait are generally of the simple hook variety whereby the hook is pierced through the live bait which is held on the hook by barbs or the like. In such hooks, the head of the live bait is fully exposed and the minnow, anchovy or the like which is being used as live bait, can easily open its mouth thus providing a non-attractive appearance for predator fish, and also leading to relatively fast drowning of the bait itself. Further, if a live anchovy, or the like, is to be used in a trolling operation, it is generally necessary to tie it relatively securely to a hook to keep it from being dragged loose therefrom.

It would be highly advantageous to provide an improved lure which could hold live bait therein, and wherein, for example, the head of an anchovy or the like would be kept within the lure so that the anchovy could not open its mouth wide, thereby presenting an unattractive target to predator fish and more quickly drowning and whereby also it is not necessary to tie on the anchovy to the lure to keep it from being torn loose during trolling or the like. It would be of a further advantage if such a lure would allow for very fast loading of an anchovy or other live bait therein, so that such a lure could be more easily used in commercial fishing operations. It would be of further advantage still to have a fishing lure which could be used as well with dead bait such as pieces of pork rind and the like as with live bait. It would be still more advantageous if such a lure could have its buoyancy adjusted internally whereby it could be used for shallow fishing in which it is jigged up and down and in deep fishing whereby it is weighted to sink to a relatively large depth, as well as for trolling. Another advantage would be to have such a lure which includes adjustment means thereon, whereby during a trolling operation the lure can be adjusted to seek different levels in the water as are required for success in catching different types of fish. The present invention provides a fishing lure which in its various embodiments has all of the above advantages.

SUMMARY OF THE INVENTION

In one sense, the invention is concerned with a fishing lure adapted to hold live, dead and artificial bait and useful for deep fishing, shallow fishing and trolling. The lure comprises a cup having a generally elliptical open end and a generally linear closed end for holding a first portion of a bait therein. A first plane passing through a first of the two axes of the generally elliptical open end generally includes the linear closed end. A second plane passing through a second of the two axes of the generally elliptical open end is generally perpendicular to the linear closed end. The generally isosceles triangular member extending from the linear closed end of the cup with the base end of the triangle being generally coextensive with the linear closed end of the cup and an apex of the triangle being spaced from the first plane so that the triangular member forms an angle with the first plane also forms a part of the lure. Leader engaging means extend from adjacent generally a central portion of the base end of the triangle in the direction of and generally past the first plane. Bait holding means extend from the open end of the cup generally longitudinally away from the linear closed end thereof. The bait holding means include anchoring means for anchoring into a second portion of the bait. Fish hook means extend from the open end of the cup into the general vicinity of the second portion of the bait.

In another sense, the invention comprises an artificial bait useful with a fishing lure as described above, the artificial bait comprising a first portion extending into the cup and a second portion extending into the vicinity of the anchoring means, the second portion having holes formed therein for receiving the anchoring means.

BRIEF DESCRIPTION OF THE DRAWINGS

The invention will be better understood by reference to the figures of the drawings wherein like numbers denote like parts throughout and wherein:

FIG. 1 comprises a side elevational view of a lure in accordance with the present invention having a live bait fish held therein;

FIG. 2 comprises a view taken along II—II of FIG. 1, partially cut away to show a lead weight therein;

FIG. 3 comprises a view taken along the line III—III of FIG. 1 partially cut away to show a low density float which can be held therein;

FIG. 4 comprises a view taken along the line IV—IV of FIG. 1;

FIG. 5 illustrates a view taken along the line V—V of FIG. 1; and

FIG. 6 illustrates an artificial bait in accordance with the present invention in partial view and its interrelationship with the fishing lure of the present invention.

DETAILED DESCRIPTION OF THE PREFERRED EMBODIMENT

Referring first to FIG. 1, there is illustrated therein a fishing lure 10 in accordance with the present invention having a fish 12 shown in phantom, held therein. In the particular embodiment of FIG. 1, the bait comprises a live fish which has its head 14 in the lure 10 in a manner which will be explained more fully in the following.

The lure 10 includes a top 16 having a generally elliptical open end 18 and a generally linear closed end 20 for holding a first portion of the bait 12 therein. In the embodiment illustrated in the Figures of the drawing, this first portion comprises the head 14 of the bait 12. It is, of course, understood that the bait 12 need not be shaped like a fish and that thus, any portion of a bait 12 which will fit within the cup 16 can serve as said first portion. A first plane 22 passing through a first of the two axes of the generally elliptical open end 18 of the cup 16 generally includes the linear closed end 20 of the cup 16. A second plane 24 passing through a second of the two axes of the generally elliptical open end 18 of the cup 16 is generally perpendicular to the linear closed end 20 of the cup 16. The generally linear nature of the closed end 20 of the cup 16 allows for relatively smooth flow of water along the outside of the cup 16 when the lure 10 is being moved forwardly through the water as in a trolling operation and as by exertion of a pulling force upon a leader 26. As can be most clear by reference to FIG. 5, the first generally elliptical axis through which the first plane 22 passes is generally a minor axis and the second generally elliptical axis through which the second plane 24 passes is generally a major axis of the generally elliptical open end 18 of the cup 16. In this manner, flow is streamlined when the lure is being pulled through the water through exertion of a pulling force upon the leader 26 first adjacent the closed end 20 of the cup 16 and thereafter adjacent open generally elliptical end 18 thereof, and past the bait 12.

Also, part of the fishing lure 10 is a generally isosceles triangular member 28 which extends from the linear closed end 20 of the cup 16 with a base end 30 of the generally isosceles triangle 28 extending from the linear closed end 20 of the cup 16 and being generally coextensive therewith. An apex 32 of the triangular member 28 is spaced from the first plane 22 so that the triangular member 28 forms a non-zero angle with the first plane 22. The triangular member 28 is preferably bendable as illustrated in FIG. 1 in dashed lines relative to the first plane 22 so that the angle therebetween is selectively adjustable.

Leader engaging means, in the embodiment illustated in the figures of the drawing includes an eye 34 extends from adjacent a central portion 36 of the generally isosceles triangular member 28 and more particularly from a central portion of the base end 30 thereof in the direction of and generally past the first plane 22.

Bait holding means extend from the open end 18 of the cup 16 generally longitudinally away from the linear closed end 20 thereof past the generally elliptical open end 18 thereof. The bait holding means preferably includes anchoring means for anchoring into a second portion 38 of the bait 12. In the embodiment illustrated in the figures of the drawing, the bait holding means comprises a pair of rod means 40, one extending generally longitudinally from each end of the first axis of the generally elliptical open end 18 of the cup 16. The rod means 40 generally extend in the first plane 22 or very closely adjacent thereto. The anchoring means preferably comprise the ends 42 of the rod means 40 furthest from the cup 16. The ends 42 are generally bent towards one another as illustrated. The rod means 40 preferably have their ends 42 biased generally towards one another. This is accomplished in the embodiment illustrated in the figures of the drawing by making the rod means 40 out of spring metal which serves to bias the rod means 40 or more particularly the ends 42 thereof towards one another.

Fish hook means 46 as illustrated in FIGS. 1–4 extend from the generally elliptical open end 18 of the cup 16 into the general vicinity of the second portion 38 of the bait 12. The hook means 46 preferably comprises a plurality of hooks 48 each extending from a single stem 50. The stem 50 is attached to the cup 16 generally via a flexible attaching means 52 such as a small chain or the like so that at least one of the hooks 48 is engageable in the second portion 38 of the bait 12. FIG. 1 illustrates most clearly the engagement of one of the hooks 48 within a bait 12 in the second portion 38 thereof. As will further be noted most clearly from FIGS. 1–3, the hooks 48 are extendable from the open end 18 of the cup 16 further than are the bent ends 42 of the rod means 40. In this manner, positive retention of the bait 12 by the lure 10 is provided. More specifically, the first portion or head 14 of the bait 12 is held within the cup 16, the bait 12 is anchored in place by the ends 42 of the rod means 40 and further, the hook 48 holds the bait 12 from slipping downwardly out of the cup 16.

In the embodiments of the invention illustrated most clearly in FIG. 6, the bait 12 includes holes 54 in the second portion 38 thereof, for receiving the ends 42 of the rod means 40. This is particularly advantageous with artificial bait since the bent ends 42 of the rod means 40 do not have to pierce the artificial bait 12. An artificial bait 12 having holes 54 therein in a second portion 38 thereof, and having a first or head portion 14 thereof extending into the cup 16 is thus particularly useful with a fishing lure 10 in accordance with the present invention.

The fishing lure 10 of the present invention has yet further advantages. For example, the cup 16 can include weight adjusting means held therein by the first portion or head 14 of the bait 12. In FIG. 2, there is illustrated weight adjusting means such as a lead weight 56 which is held in place by the head 14 of the bait 12. In the embodiment shown in FIG. 3, the weight adjusting means comprises a float 58 which can be made of wood, styrofoam or the like, but which has a generally lower density than water just as the lead weight 56 has a higher density than water. The lead weight 56 is particularly useful when it is desired to use the lure 10 at a depth considerably below the surface of the water in which an angler is fishing. The float 58 is particularly useful in accordance with the present invention when the angler desires to be able to jig the lure 10 adjacent to the surface of the water.

The lure 10 can be made of any number of appropriate materials. For example, it can be fabricated of metal or of any of a number of plastic or elastomeric materials. Further, the lure 10 can be made in any number of sizes with the size of the lure being chosen to be most effective with the particular type of fish being sought. It should be noted that the lure 10 of the present invention is particularly useful for commercial fishermen who desire to use live bait to catch such fish as salmon, tuna and the like. The advantage of the present invention is that the live bait can be very quickly and securely fastened to the lure 10. Very simply, the fishermen simply spread apart the rod means 40 and inserts the head of the live bait, for example, an anchovy, into the cup 16, then allows the bent end 42 of the rod means 40 to pierce the sides of the live bait and finally hooks one of the hooks 48 into the live bait 12. In this manner, the live bait 12 can be held within the lure 10 in a sure and positive manner and can be set in a very short period of time. This is in contrast to current procedures for fastening live bait as are used by commercial fishermen wherein the live bait is generally tied securely to the lure being used, thus slowing down considerably the rate of fishing.

It should further be noted that the bendable nature of the attachment of the generally isosceles triangular member 28 to the closed end 20 of the cup 16 is desirable since it allows the angle of contact between the triangular member 28 and the water through which the lure 10 is being pulled by tension exerted upon the leader 26 to be varied. This allows the lure 10 to be moved at particular depths as are desirable for different fishes or for particular classes of fish at different times of the day, year, etc. It should further be noted that keeping the head 14 of the live bait 12 within the cup 16 is particularly advantageous in that it forces the live bait 12 to keep its mouth generally closed whereby drowning of the live bait 12 is delayed. Further, since the head 14 of the bait 12 is hidden within the cup 16, the live bait 12 provides a more attractive appearance to fish which might not be attracted to a live bait which had its mouth open.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

I claim:

1. A fishing lure adapted to hold live, dead and artificial bait and useful for deep fishing, shallow fishing and trolling, comprising:
   1. a cup having a generally elliptical open end and a generally linear closed end for holding a first portion of a bait therein, a first plane passing through a first of the two axes of said generally elliptical open end generally including said linear closed end and a second plane passing through a second of said two axes of said generally elliptical open end being generally perpendicular to said linear closed end;
   2. a generally isosceles triangular member extending from said linear closed end of said cup with a base end of said triangle being generally co-extensive with said linear closed end of said cup and an apex of said triangle being spaced from said first plane so that said triangular member forms an angle with said first plane;
   3. a leader engaging means extending from generally a central portion of said base end of said triangle in the direction of said first plane;
   4. a bait holding means extending from said open end of said cup generally longitudinally away from said linear closed end thereof, said bait holding means including anchoring means for anchoring into a second portion of said bait; and
   5. a fish hook means extending from said open end of said cup into the general vicinity of said second portion of said bait.

2. A fishing lure as in claim 1, wherein said bait holding means comprises a pair of rod means, one extending generally longitudinally from each end of said first axis generally in said first plane and said anchoring means comprises the ends of said rod means furthest from said cup, said ends being bent generally towards one another.

3. A fishing lure as in claim 2, wherein said rod means are of spring metal construction.

4. A fishing lure as in claim 3, wherein said hook means comprises a plurality of hooks extending from a single stem, said stem is attached to said cup via flexible attaching means so at least one of said hooks is engagable in said second portion of said bait, and said hooks are extendable from said open end of said cup further than said bent ends of said rod means to provide positive retention of said bait by said lure.

5. A fishing lure as in claim 4, wherein said first and second generally elliptical axes comprise respectively a minor and a major axis of said generally elliptical open end of said cup.

6. A fishing lure as in claim 5, wherein said triangular member is bendable relative to said first plane to adjust the angle therebetween.

7. A fishing lure as in claim 1, including said bait with said first portion thereof extending into said cup and said second portion thereof extending into the vicinity of and being engaged by said anchoring means.

8. A fishing lure as in claim 7, wherein said bait includes holes in said second portion thereof receiving said anchoring means.

9. A fishing lure as in claim 8, wherein said cup has weight adjusting means held therein by said first portion of said bait.

10. A fishing lure as in claim 9, wherein said weight adjusting means has a higher density than water.

11. A fishing lure as in claim 9, wherein said weight adjusting means has a lower density than water.

12. An artificial bait useful with a fishing lure which comprises a cup having a generally elliptical open end and a generally linear closed end for holding a first portion of a bait therein, a first plane passing through a first of the two axes of said generally elliptical open end generally including said linear closed end and a second plane passing through a second of said two axes of said generally elliptical open end being generally perpendicular to said linear closed end; a generally isosceles triangular member extending from said linear closed end of said cup with a base end of said triangle being generally co-extensive with said linear closed end of said cup and an apex of said triangle being spaced from said first plane so that said triangular member forms an angle with said first plane; a leader engaging means extending from generally a central portion of said base end of said triangle in the direction of said first plane; a bait holding means extending from said open end of said cup generally longitudinally away from said linear closed end thereof, said bait holding means including anchoring means for anchoring into a second portion of said bait; said bait comprising a first portion extending into the vicinity of said anchoring means, said second portion having holes formed thereinto for receiving said anchoring means.

* * * * *